United States Patent
Ross: John M. et al.

[15] 3,690,092
[45] Sept. 12, 1972

[54] MOBILE PLATFORM STRUCTURE FOR FRUIT PICKERS

[72] Inventors: John M. Ross, Upland; Ronald T. Smith, Ontario, both of Calif.

[73] Assignee: Sunkist Growers, Inc., Los Angeles, Calif.

[22] Filed: April 27, 1970

[21] Appl. No.: 31,924

[52] U.S. Cl. .................................... 53/391, 182/129
[51] Int. Cl. ...... B65b 67/02, B60p 1/50, A01g 19/04
[58] Field of Search ....53/59, 248, 390, 391; 182/12, 182/13, 62.5, 129, 63, 124, 130–132, 141, 148; 214/83.1, 83.24, 502, 512

[56] References Cited

UNITED STATES PATENTS

| | | |
|---|---|---|
| 2,450,152 | 9/1948 | Miller..........................214/83.1 |
| 3,305,113 | 2/1967 | Gardner.....................214/83.1 |
| 3,493,132 | 2/1970 | Merrill.......................214/83.1 |
| 3,523,404 | 8/1970 | Girardi........................53/391 |
| 3,529,696 | 9/1970 | Jacobsen...................182/129 |
| 3,537,236 | 11/1970 | Fridley..........................53/391 |
| 3,437,174 | 4/1969 | Coblentz et al........182/129 X |

*Primary Examiner*—Robert L. Spruill
*Attorney*—Paul A. Weilein

[57] ABSTRACT

A self-propelled vehicle for travel between two rows of fruit trees has platforms for pickers at different levels that are extendable in opposite directions into the two rows of trees. Picked fruit is conveyed from the various platforms to successive field bins at a bin-filling station on the vehicle and a lift fork on the vehicle picks up empty bins as needed.

18 Claims, 32 Drawing Figures

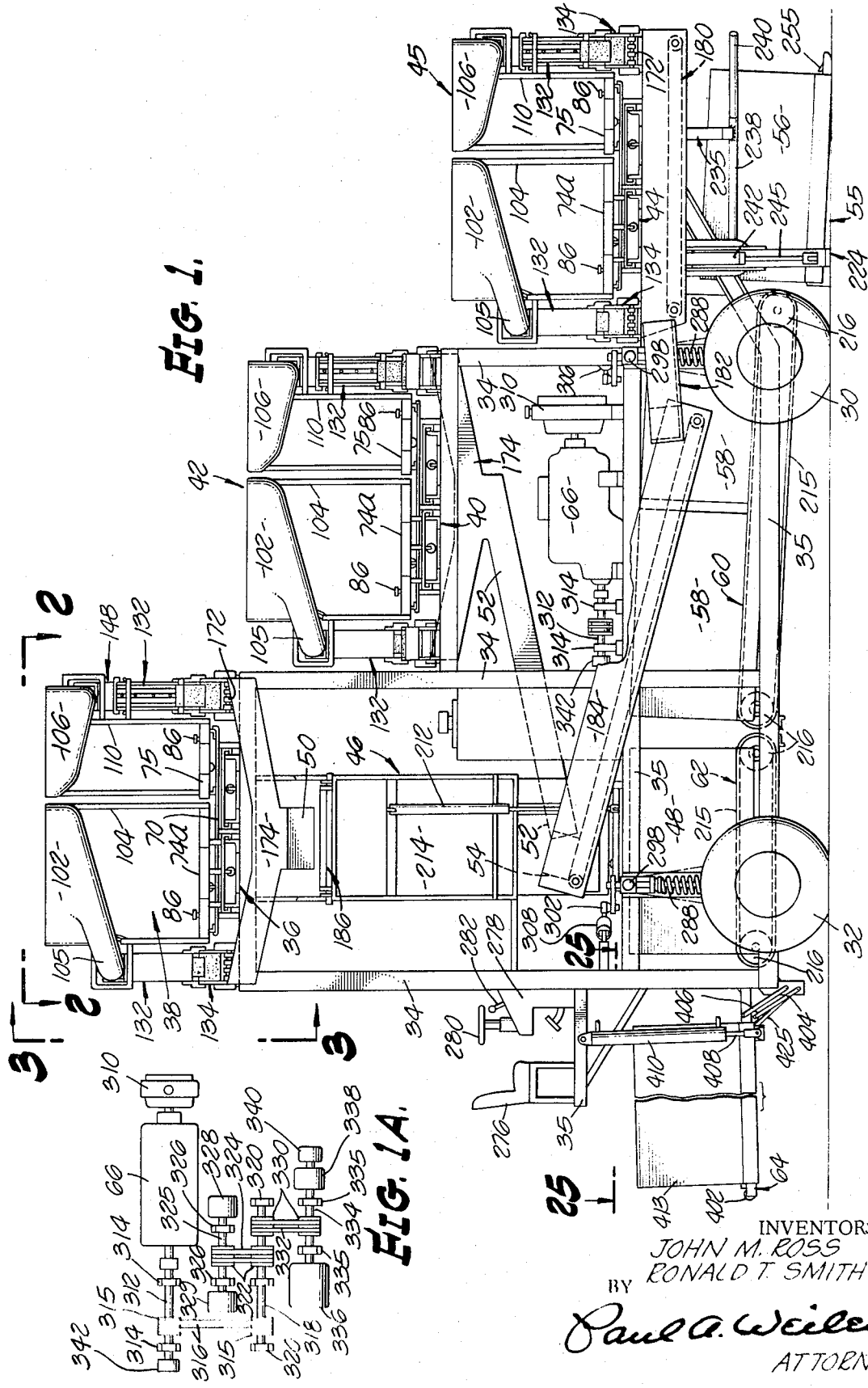

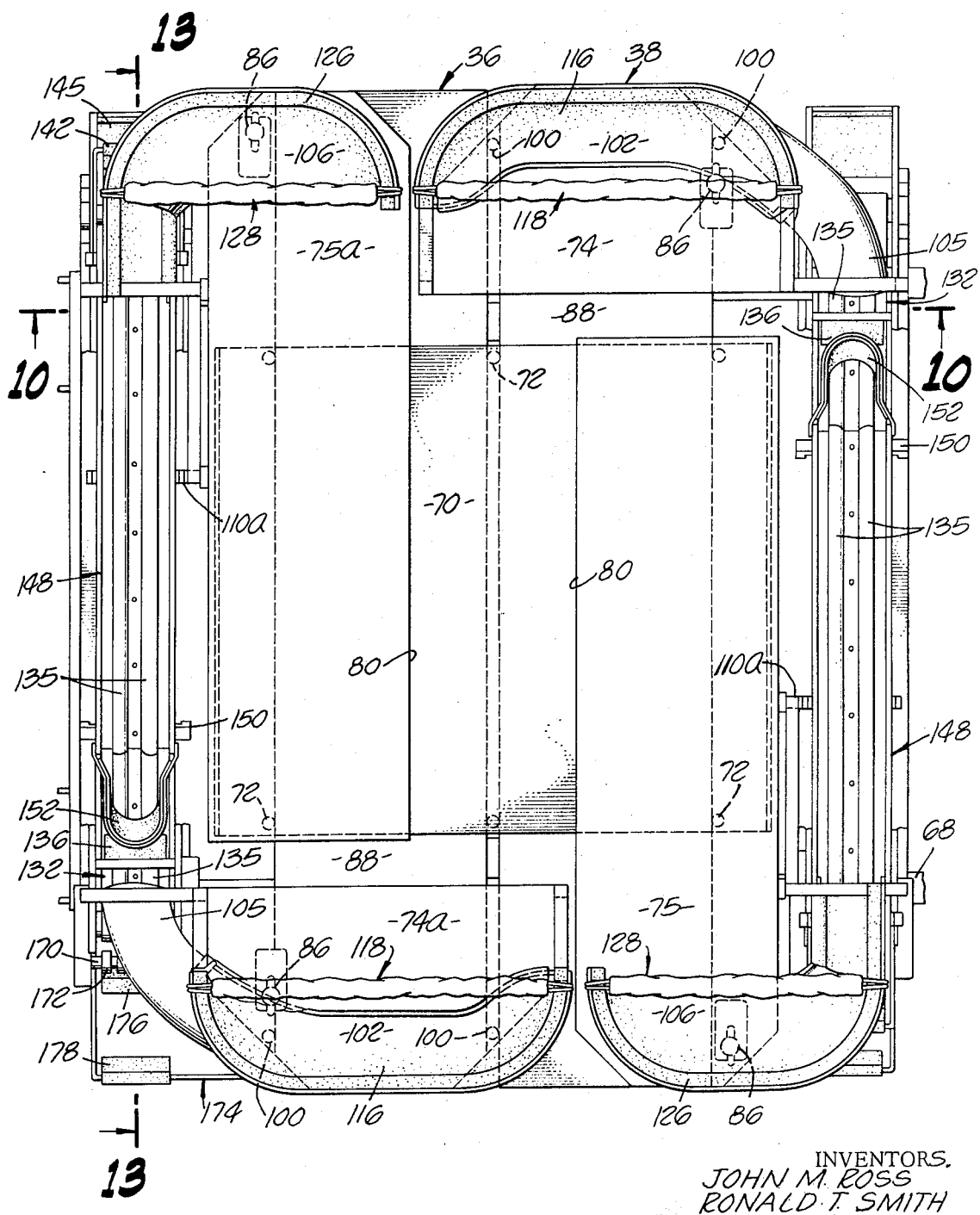

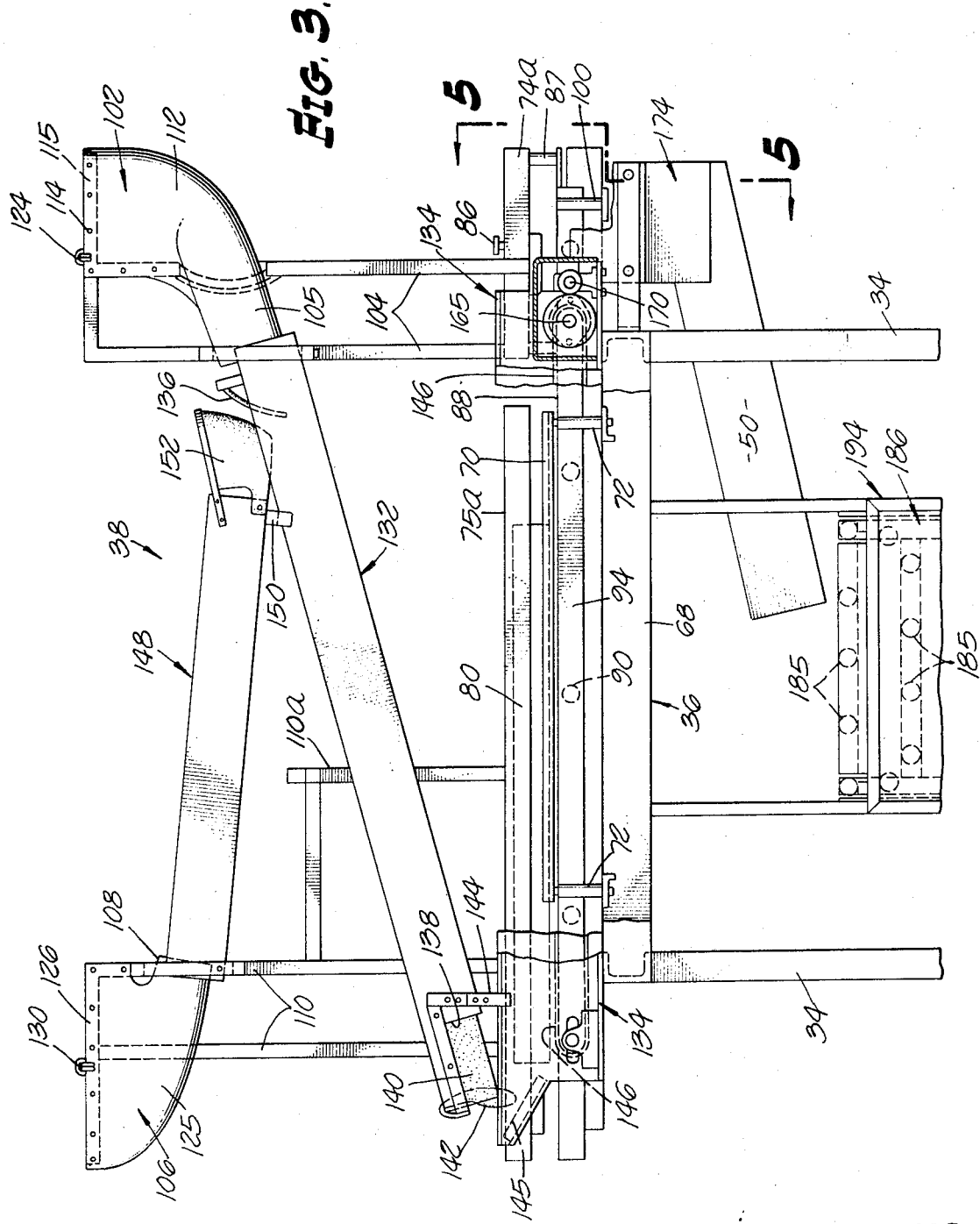

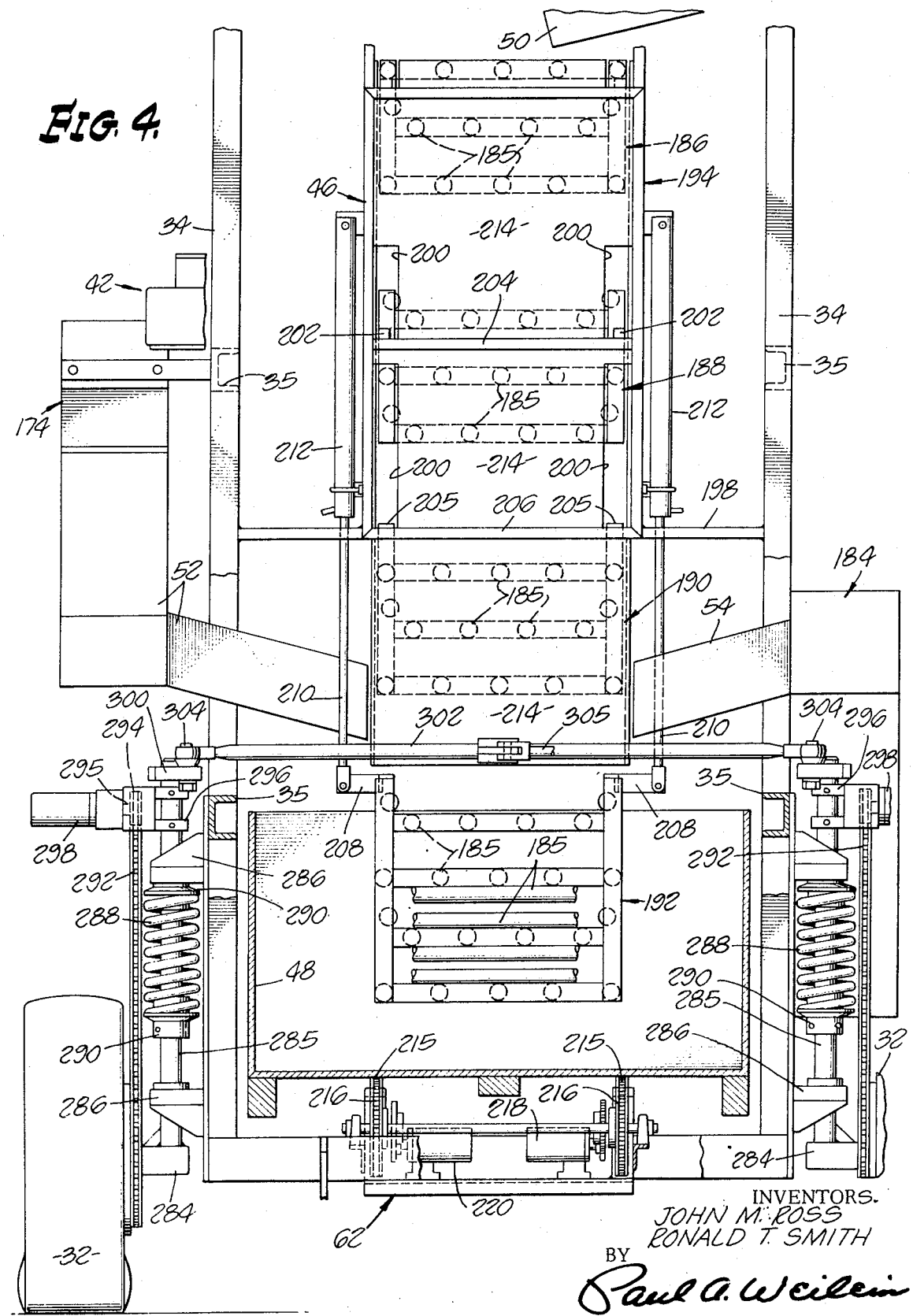

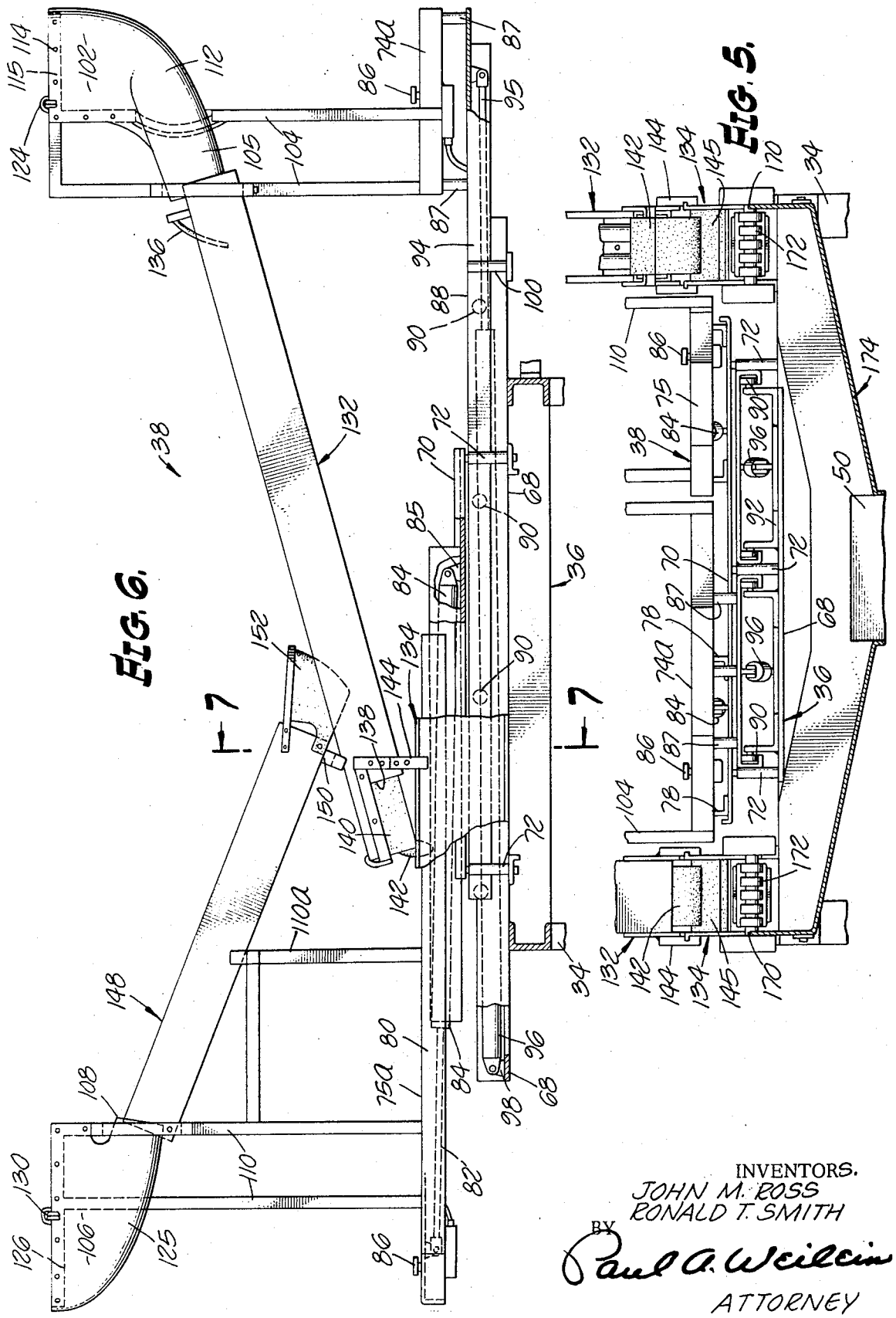

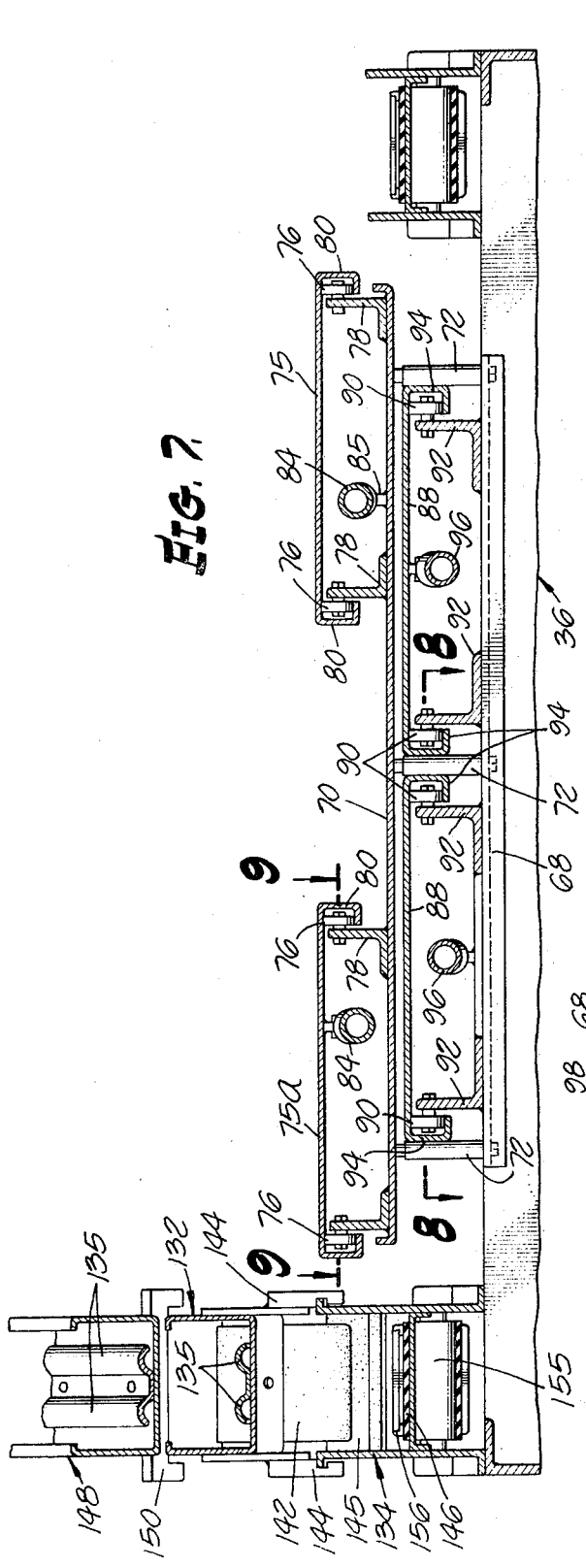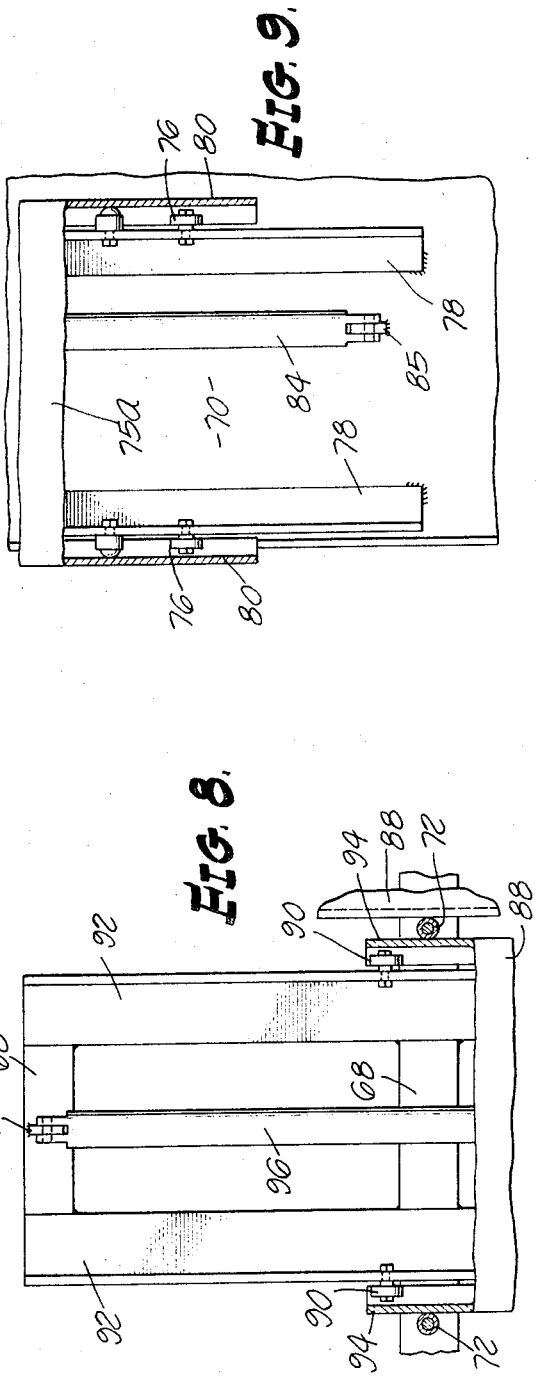

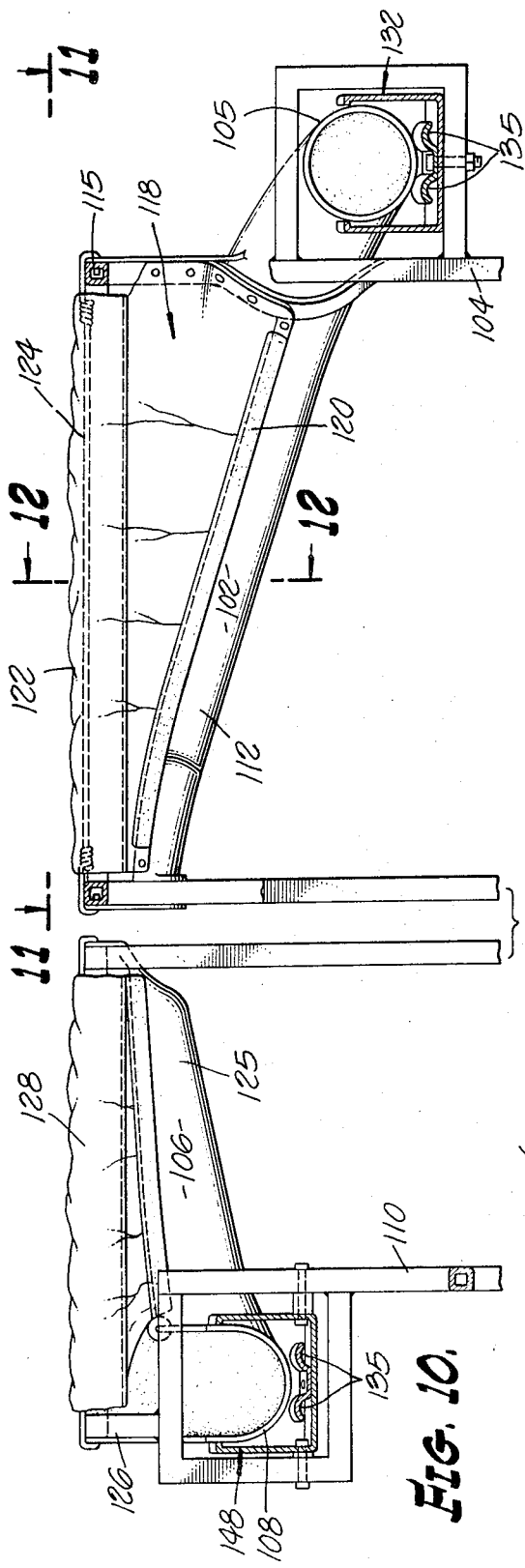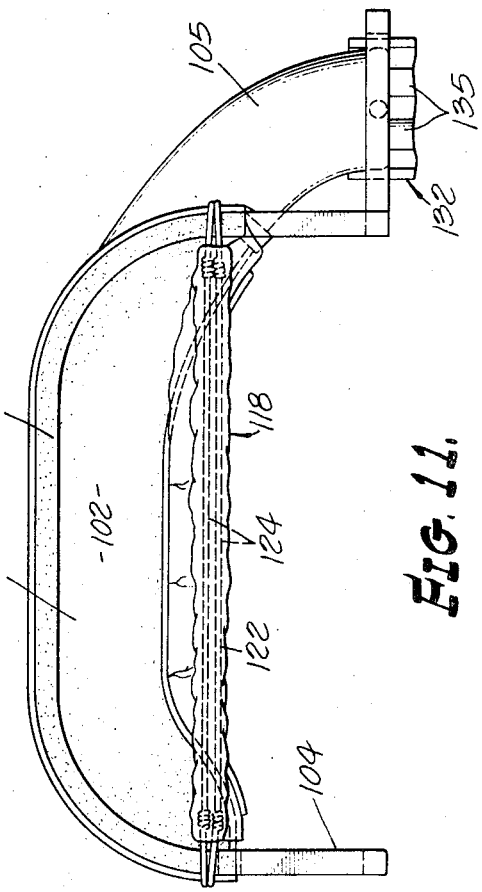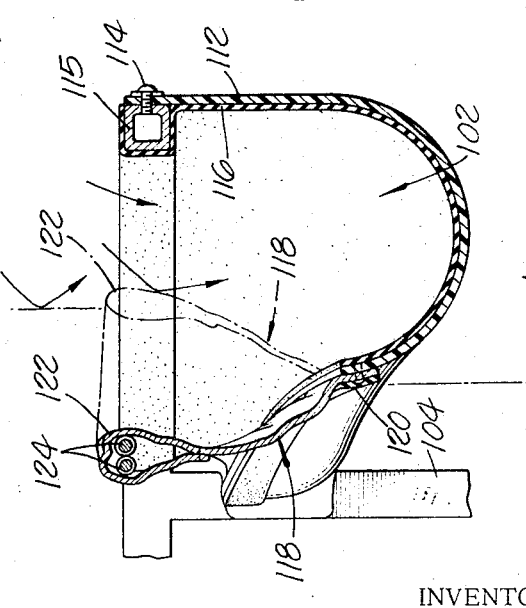

INVENTORS.
JOHN M. ROSS
RONALD T. SMITH
BY Paul A. Weilein
ATTORNEY

INVENTORS.
JOHN M. ROSS
RONALD T. SMITH
BY Paul A. Weilein
ATTORNEY

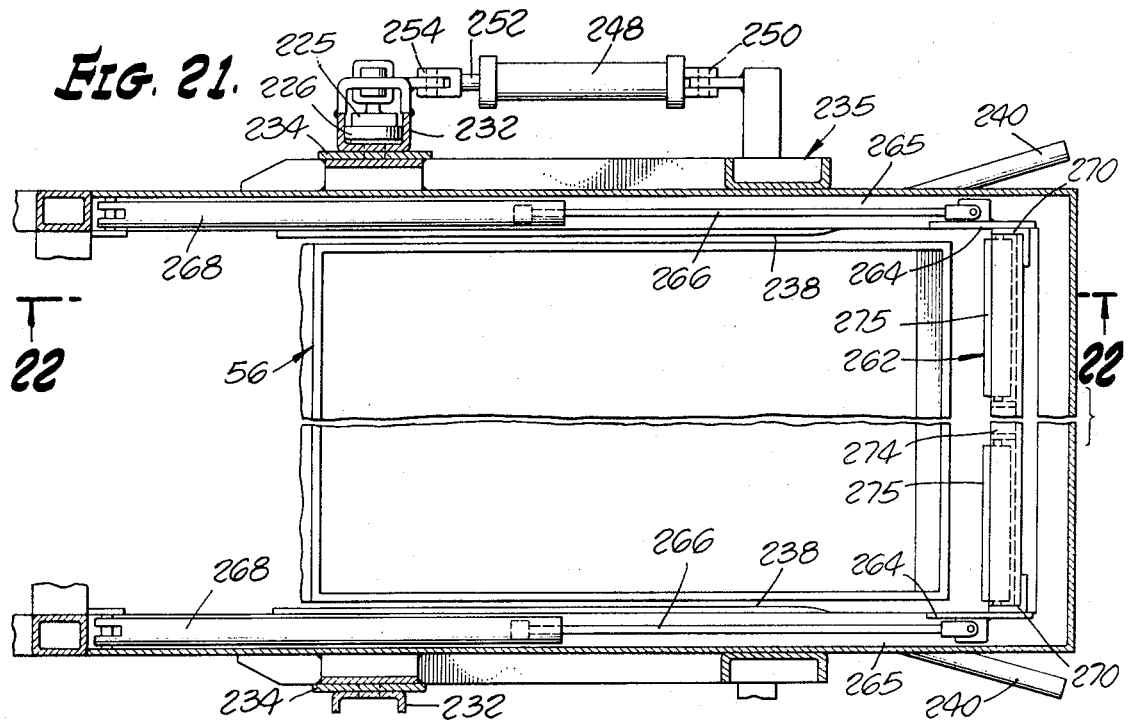
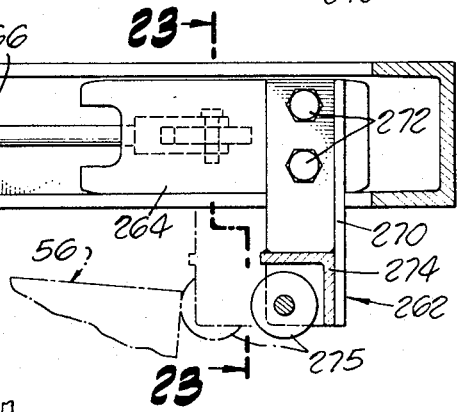
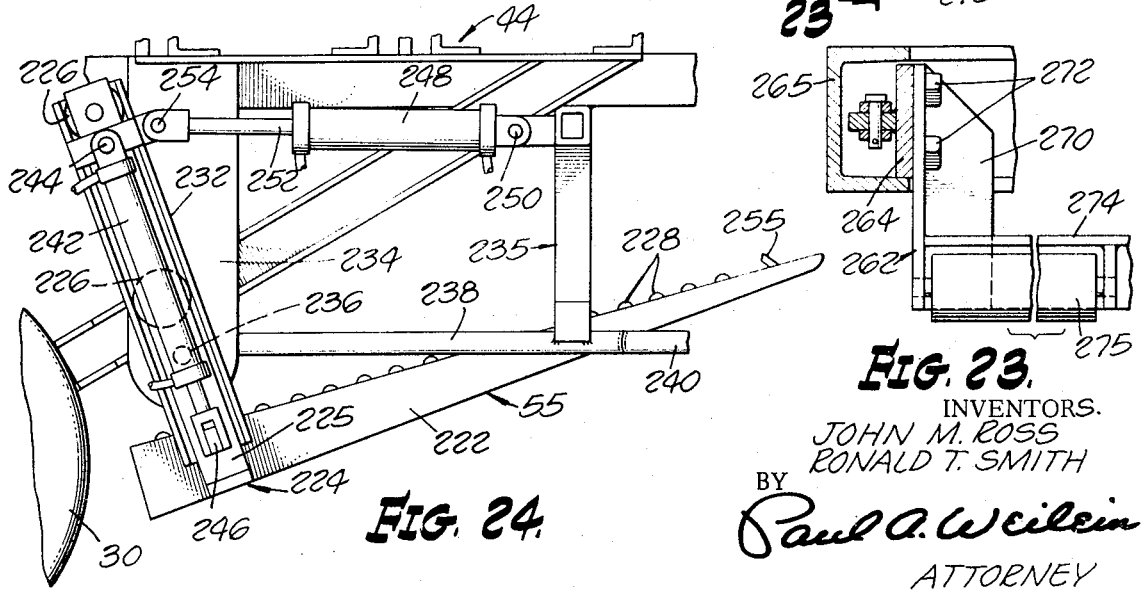

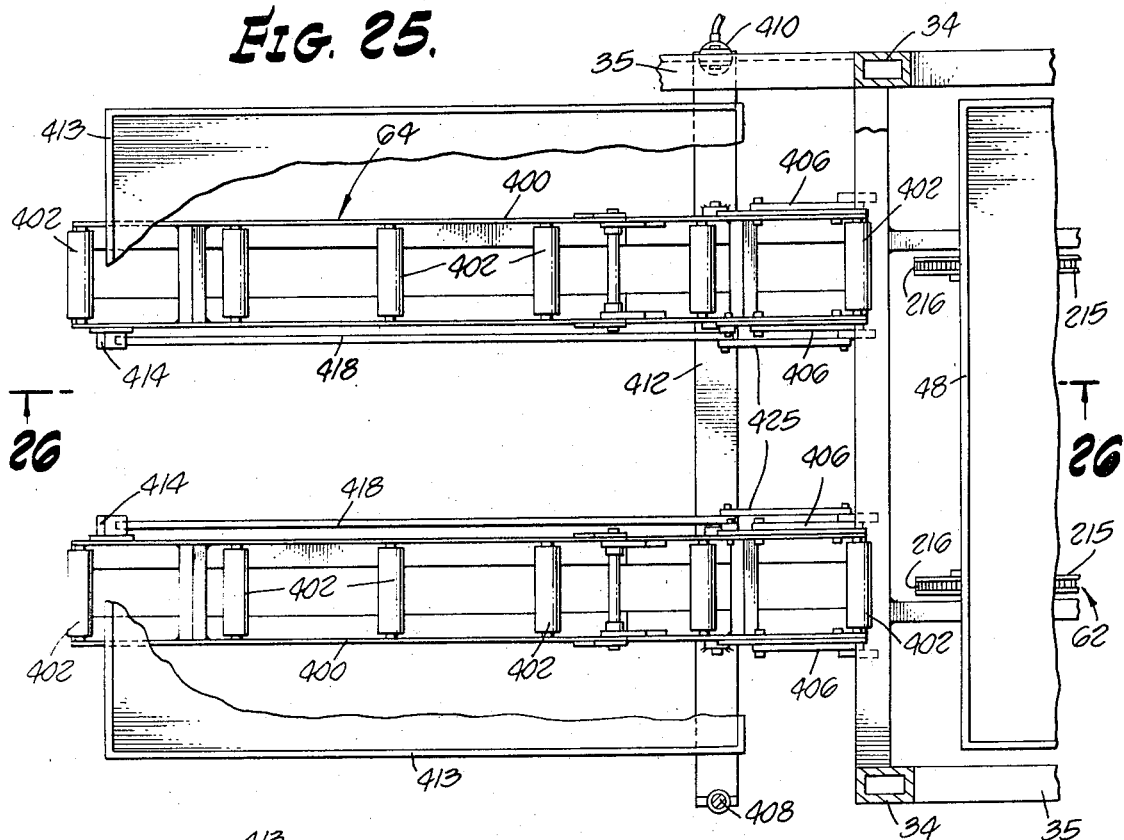

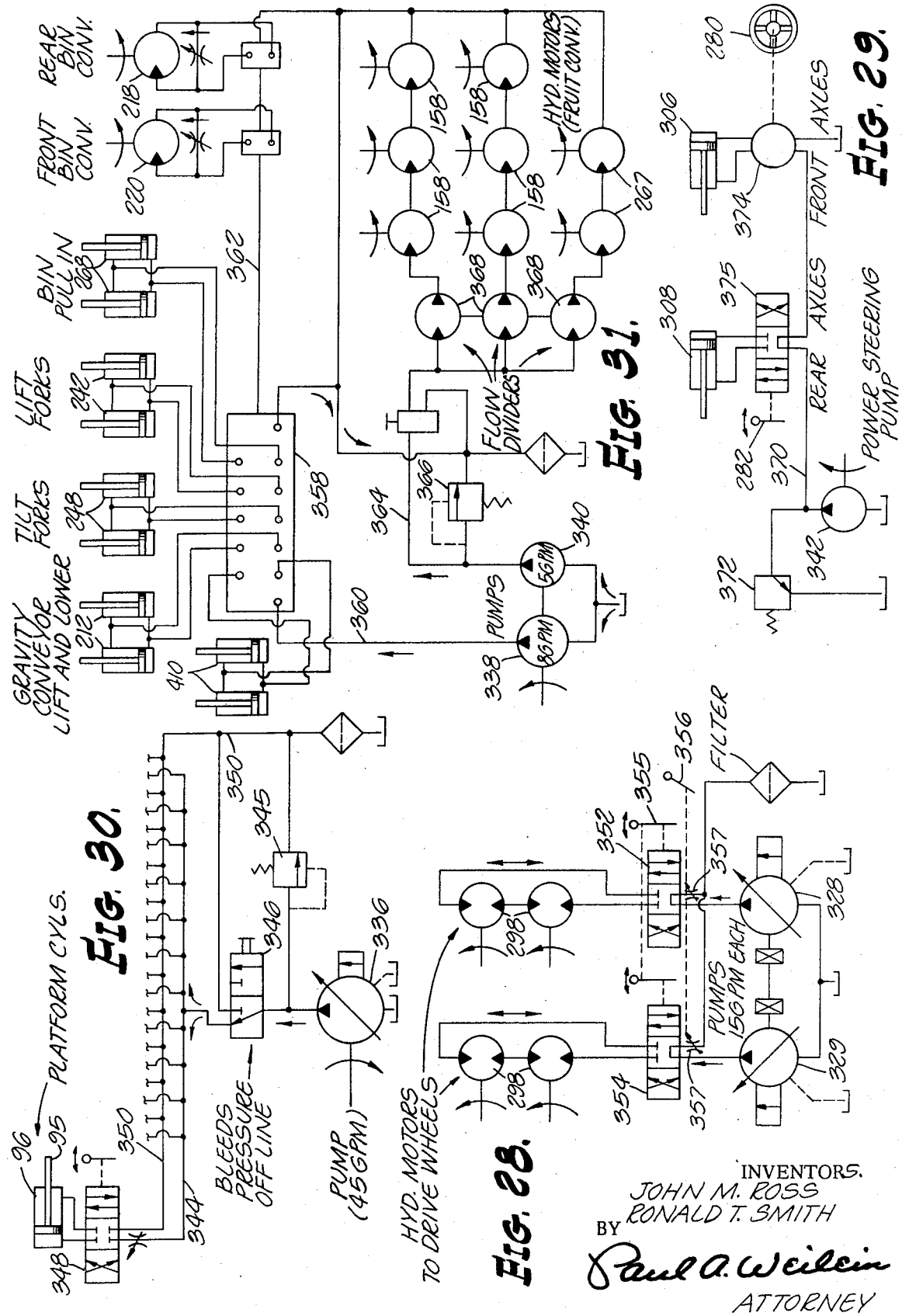

MOBILE PLATFORM STRUCTURE FOR FRUIT PICKERS

BACKGROUND OF THE INVENTION

Fruit picked from trees in an orchard must be delivered to field bins or boxes on the ground which are taken to a central pickup station for subsequent transportation from the orchard. Because it is time-consuming and expensive to use crews of pickers that carry sacks and use individual ladders, various labor-saving mobile platform structures have been developed to facilitate the picking of fruit from trees. There is still need, however, to eliminate manual effort and time-consuming motion both in picking the fruit from the trees and in delivering the fruit to the field bins. Ideally, such a labor-saving platform structure should be capable of use between two rows of trees for harvesting fruit from the two rows simultaneously with power means on the platform structure to pick up empty field bins and to deposit full field bins en route. The present invention is directed to this ideal.

SUMMARY OF THE INVENTION

A self-propelled vehicle has three platform assemblies at three different levels, each assembly comprising two platforms that are variably extendable in their planes in one lateral direction from the vehicle and two platforms that are variably extendable in the same manner in the opposite lateral direction. Each platform has a hopper at its leading end to receive picked fruit and a conveyor system is effective at all positions of extension of the platform to transport fruit from the hopper to successive field bins at a bin-filling station on the vehicle.

The conveyor system includes a gravity conveyor which receives the picked fruit at different levels and permits the fruit to fall therethrough by increments of fall that are too small to damage the fruit. The successive empty field bins are positioned at the bin-filling station under the gravity conveyor and the gravity conveyor is capable of downward extension into the empty bins and upward retraction to clear the full bins.

A lift fork incorporated into the front end of the vehicle picks up empty or partially filled bins in the path of the vehicle and bin conveyor means moves the empty bins to the bin-filling station and subsequently moves the full bins from the bin-filling station to a ramp means on the rear end of the vehicle where the full bins are lowered to the ground.

A suitable internal combustion power plant on the vehicle provides hydraulic power for a number of different purposes, including: actuation of portions of the fruit conveyor system; actuation of the lift fork; actuation of the bin conveyor means; extension and retraction of the individual platforms; actuation of the ground wheels to propel the vehicle; and power steering of the vehicle. The extension and retraction of the platforms is controlled by three-position foot pedals on the individual platforms and the driver of the vehicle operates remote controls for the lift fork and for the bin conveyor means.

The features and advantages of the invention may be understood from the following detailed description and the accompanying drawings.

BRIEF DESCRIPTION OF THE DRAWINGS

FIG. 1 is a side elevation of a vehicle incorporating the initial embodiment of the invention;

FIG. 1A is a diagram of the hydraulic power plant on the vehicle;

FIG. 2 is an enlarged plan view of the highest platform assembly as seen along the line 2—2 of FIG. 1;

FIG. 3 is a fragmentary side elevational view of the highest level platform assembly as seen along the line 3—3 of FIG. 1;

FIG. 4 is an elevational view of the structure below the highest level platform assembly showing the gravity conveyor that delivers fruit to the field bins at the filling station on the vehicle;

FIG. 5 is an elevational view of the highest level platform assembly as seen along the line 5—5 of FIG. 3;

FIG. 6 is a view similar to FIG. 3 showing a pair of the platforms of the highest level platform assembly extended in their opposite directions laterally of the vehicle;

FIG. 7 is a sectional view of the highest level platform assembly taken along the line 7—7 of FIG. 6;

FIG. 8 is a horizontal section along the line 8—8 of FIG. 7;

FIG. 9 is a horizontal section along the line 9—9 of FIG. 7;

FIG. 10 is an elevational view of the hoppers of a pair of platforms of the highest level platform assembly as seen along the line 10—10 of FIG. 2;

FIG. 11 is a fragmentary plan view of one of the hoppers as seen along the line 11—11 of FIG. 10;

FIG. 12 is a sectional view of the same hopper taken along the line 12—12 of FIG. 10;

FIG. 18 is a fragmentary plan view of a portion of the lift fork as seen along the line 18—18 of FIG. 17;

FIG. 21 is a fragmentary section taken along the line 21—21 of FIG. 15 showing the lift fork in plan view;

FIG. 22 is a section along the line 22—22 of FIG. 21 showing the mechanism for pulling the empty field bins from the lift fork onto the bin conveyor means;

FIG. 23 is a fragmentary section taken along the line 23—23 of FIG. 22;

FIG. 24 is a view similar to FIG. 17 showing the lift fork both elevated and tilted rearwardly;

FIG. 25 is a view as seen along the line 25—25 of FIG. 1, showing in plan the ramp for discharging filled field bins;

FIG. 26 is a sectional view of the ramp as seen along the line 26—26 of FIG. 29;

FIG. 27 is a fragmentary sectional view taken along the line 27—27 of FIG. 30;

FIG. 28 is a diagram of the hydraulic system for driving the ground wheels;

FIG. 29 is a diagram of the hydraulic system for power steering;

FIG. 30 is a diagram of the hydraulic system for extending and retracting the various platforms; and FIG. 31 is a diagram of the hydraulic system for handling and conveying the field bins.

BRIEF DESCRIPTION OF THE INITIAL EMBODIMENT OF THE INVENTION

GENERAL ARRANGEMENT

Figure 13:
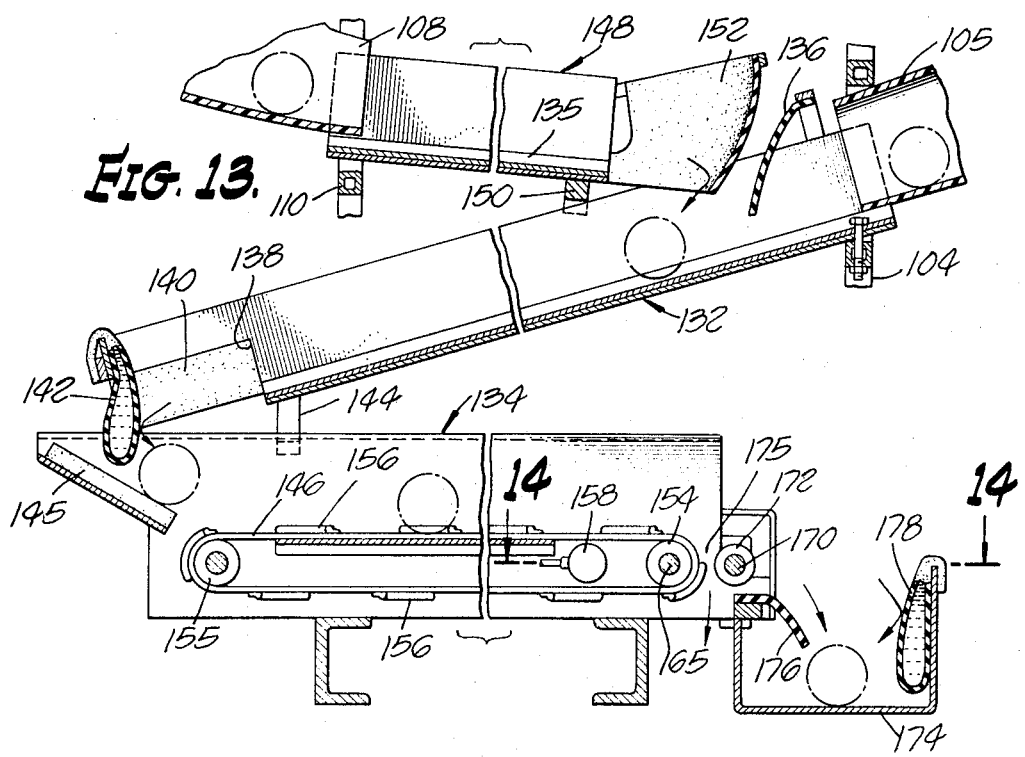
FIG. 13 is a fragmentary sectional view of portions of the highest level platform assembly taken along the line 13—13 of FIG. 2.

As shown in FIG. 1, the apparatus comprises a vehicle in the form of a framework mounted on a pair of forward ground wheels 30 and a pair of rear ground wheels 32. The framework comprises various vertical frame members 34 and horizontal frame members 35 and incorporates an uppermost base structure generally designated 36 for an uppermost platform assembly generally designated 38, an intermediate base structure generally designated 40 at an intermediate level for an intermediate platform assembly, generally designated 42, and a lowermost forward base structure 44 for a lowermost forward platform assembly generally designated 45.

An upright gravity conveyor, generally designated 46, is constructed to permit picked fruit to gravitate downwardly therethrough without damage to fill field bins at a bin-filling station on the vehicle, the bin-filling station being represented by a field bin 48. A chute 50 delivers fruit from the uppermost platform assembly 38 to the top of the gravity conveyor 46; a second chute 52 delivers fruit from the intermediate platform assembly 42 to a lower level of the gravity conveyor; and a third chute 54 delivers fruit from the lowest platform assembly 45 to the same lower level of the gravity conveyor.

FIG. 1 further shows a lift fork 55 at the front end of the vehicle that has picked up a field bin 56 from the ground in the path of forward movement of the vehicle. Two additional empty field bins 58 previously picked up by the lift fork 55 are on a forward bin conveyor 60 awaiting delivery to a rear bin conveyor 62 on which the previously mentioned field bin 48 rests at the bin-filling station. The successive completely filled bins at the bin-filling station are delivered by the rear bin conveyor 62 to discharge ramp means 64 at the rear end of the vehicle.

Various hydraulic pumps actuated by an internal combustion engine 66 provides hydraulic power for various purposes including: extension and retraction of the platforms of the three platform assemblies; actuation of various conveyors for delivering picked fruit to the three chutes 50, 52 and 54 that are associated with the gravity conveyor 46; downward extension and retraction of the gravity conveyor 46; actuation of the bin conveyors 60 and 62; actuation of the lift fork 55; actuation of bin-shifting means for shifting bins from the lift fork onto the rear conveyor 60; actuation of the discharge ramp means 64; actuation of the two pairs of ground wheels to propel the vehicle; and power steering for the two pairs of ground wheels.

CONSTRUCTION OF THE PLATFORM ASSEMBLIES

Each of the three base structures 36, 40, and 44 serves as a deck to support the corresponding platform assembly. Since all three of the platform assemblies 38, 42, and 45 are identical, it will suffice to describe the construction of the uppermost platform assembly 38 on the uppermost base structure 36.

As best shown in FIGS. 5 and 6, the base structure 36 has a lower deck 68 and an upper deck 70, the upper deck being supported from the lower deck by a plurality of short posts 72. As shown in plan in FIG. 2, the platform assembly 38 comprises a forward pair of oppositely extendable platforms 74 and 75 and a rearward pair of oppositely extendable platforms 74a and 75a, the two pairs being identical with the two platforms 75 and 75a diagonally opposite from each other and with the two platforms 74 and 74a diagonally opposite from each other.

As may be seen in FIG. 2, the two platforms 74 and 74a have relatively wide outer end floor portions, whereas the two platforms 75 and 75a are relatively narrow with full length floor surfaces. It is also to be noted that the four platforms have their floor surfaces in substantially the same horizontal plane. FIGS. 2 and 3 show the four platforms at their fully retracted positions and FIG. 6 shows the platforms extended.

Referring to FIGS. 5, 6, and 7, each of the two narrow platforms 75 and 75a is mounted on rollers 76 for extension and retraction and the rollers in turn are mounted on angle irons 78 on the upper deck 70 of the base structure. The two longitudinal sides of the two platforms 75 and 75a are bent to form corresponding inwardly turned channels 80 that enclose the rollers 76. When the two platforms 75 and 75a are fully retracted, they rest on the upper sides of the rollers 76, but when the platforms are fully extended, they fulcrum on the outermost pair of rollers and press upwardly on the undersurfaces of the innermost rollers.

For extension and retraction of each of the narrower platforms 75, 75a, each platform is connected to a corresponding piston rod 82 (FIG. 6) of a corresponding hydraulic power cylinder 84, the rear end of which is mounted on the upper deck 70 by a bracket 85. Each hydraulic cylinder 84 is controlled by a corresponding three-position foot pedal 86 which operates a corresponding four-way valve.

To make it possible for the outer end portions of the wider platforms 74 and 74a to be on the same level as the narrower platforms 75 and 75a, the wider platforms are mounted by posts 87 on corresponding lower support portions 88 which constitute extensions of the wider platforms and are slidingly mounted on the lower deck 68 of the base structure 36. As shown in FIGS. 5, 6, and 7, the lower support portions 88 of the wider platforms 74 and 74a are mounted on rollers 90 which in turn are mounted on angle irons 92 on the lower deck 68. The lower support portions 88 serve as auxiliary platforms and, in a manner heretofore described, the lower support portions 88 are formed with inwardly turned longitudinal side channels 94 which enclose the rollers 90. For power-actuated extension and retraction of the wider platforms 74 and 74a, each of the corresponding lower support portions 88 is connected to a corresponding piston rod 95 of a corresponding hydraulic cylinder 96, the rear end of which is mounted on the lower deck 68 by a bracket 98. Here again, each hydraulic cylinder 96 is controlled by a corresponding three-position foot pedal 86 which operates a corresponding four-way valve.

Each of the lower support portions 88 is confined between pairs of the previously mentioned posts 72 and between an additional pair of forward posts 100 (FIGS. 2, 3, and 6). As may be seen in FIG. 2, the lower support portions 88 of the wider platforms 74 and 74a can be retracted between the decks 68 and 70 and are largely masked by the narrower platforms 75 and 75a when all four of the platforms are retracted. When the wider platforms 74 are extended, however, as shown in FIG. 6, the upper surfaces of the lower support portions 88 are exposed to serve as auxiliary platforms on which a fruit picker may walk or stand.

As shown in FIGS. 1, 2, and 3, each of the wider platforms 74 and 74a of the three levels has a hopper 102 on its outer end to receive picked fruit, the hopper being supported at the level of a fruit picker's waist by means of an upwardly extending frame 104. Each of the hoppers 102 is formed with a discharge spout 105 to deliver the fruit to a fruit conveyor system which will be described later. In like manner, each of the narrower platforms 75 and 75a is provided with a hopper 106 at its outer end that has a discharge spout 108 and is supported waist-high by a frame 110.

Referring to FIGS. 10 and 11, each of the hoppers 102 on the wider platforms 74 and 74a may comprise a molded wall 112 of rigid plastic material, for example, a molded piece of fiberglass which forms the front and two sides of the hopper and which is attached by screws 114 to a member 115 of the frame 104. Preferably, the plastic wall 112 is equipped with a soft rubber liner 116.

The inner side of the hopper 102, which side is nearest to a picker on the platform, comprises a piece of flexible fabric 118, the lower edge of which is bonded to the plastic wall 112 by means including a flexible plastic strip 120. The upper portion of the fabric 118 is folded on itself to form a hem 122 which encloses a pair of elastic members 124 which are connected at their opposite ends to the frame 104. Thus, the portion of the hopper 102 that is nearest to a picker on a platform 74 or 74a is elastically yieldable so that if the picker leans against the inner side of the hopper the hopper will elastically conform to the configuration of the picker's body and make it a simple matter for the picker to drop fruit into the hopper.

Each of the hoppers 106 on the narrow platforms 75 and 75a is of similar construction. Thus, each hopper 106 has a rubber lined plastic wall 125 supported by a member 126 of the frame 110 and the hopper further has an inner wall of fabric 128 which is reinforced by concealed elastic members 130 (FIG. 3) which correspond to the elastic members 124 of the hoppers 102.

FRUIT CONVEYOR SYSTEM

Referring to FIG. 3, each of the two hoppers 102 of the platform assemblies on the three levels discharges into a corresponding downwardly inclined chute 132 which in turn discharges into a corresponding horizontal side conveyor 134 on the corresponding side of the platform assembly, there being two such side conveyors on the forward and rearward sides respectively of each platform assembly. As shown in FIGS. 2 and 10, the bottom wall of each of the inclined chutes 132 is provided with a pair of longitudinal ribs 135 which divide the bottom of the chute into three longitudinal grooves or guideways for the gravitating fruit.

To minimize damage to the fruit as it is discharged from each hopper 102 into the corresponding chute 132, the upper end of the chute is provided with an overhanging flexible baffle 136 to slow down the movement of the fruit. The bottom wall of the chute is cut away as indicated at 138 to form an opening for discharge of the fruit into the corresponding side conveyor 134, this discharge opening being flanked by a pair of flexible flaps 140. The lower end of the chute 132 is provided with a bag 142 which is partially filled with water to act as a yielding buffer to decelerate the fruit without damage to the fruit.

The lower end of each inclined chute 132 is supported by a bracket 144 that is slidable along the upper edges of the two side walls of the corresponding side conveyor 134, and when the lower end of the inclined chute is near the receiving end of the side conveyor as shown in FIGS. 3 and 13, the fruit that is decelerated by the bag 142 drops onto a plastic foam cushion 145 which diverts the fruit onto the belt 146 of the side conveyor.

Each of the hoppers 106 at the outer end of each of the narrow platforms 75 discharges into a corresponding inclined chute 148 which is of the same general construction as the inclined chutes 132 and which is positioned above the corresponding chute 132. The lower end of each of the chutes 148 is supported by a bracket 150 that is slidable along the top edges of the two side walls of the corresponding lower inclined chute 132. When the fruit gravitating down an upper chute 148 reaches the bottom of the chute, it is deflected by a rubber apron 152 into the corresponding lower chute 132.

FIG. 3 shows the positions of the inclined chutes 132 and 148 when the two corresponding platforms 74a and 75a are retracted and FIG. 6 shows the positions of the inclined chutes when the two platforms are extended. It will be noted in FIG. 6 that when the platform 75a is extended to its limit, the weight of the lower end of the chute 148 is transferred from the chute 132 to an extension 110a of the frame 110. It is apparent that the two chutes 132 and 148 accommodate themselves to the extension and retraction of the platforms by virtue of the sliding connection of the chute 148 with the chute 132 and the sliding connection of the chute 132 with the corresponding side conveyor 134.

It is apparent that each pair of chutes 132 and 148 comprises a chute assembly that expands and contracts to follow the extension and retraction of the corresponding platforms. It is also apparent that the discharge outlet of each chute assembly is movable along the length of the corresponding side conveyor 134 to accommodate the expansion and contraction of the chute assembly.

Figure 14:
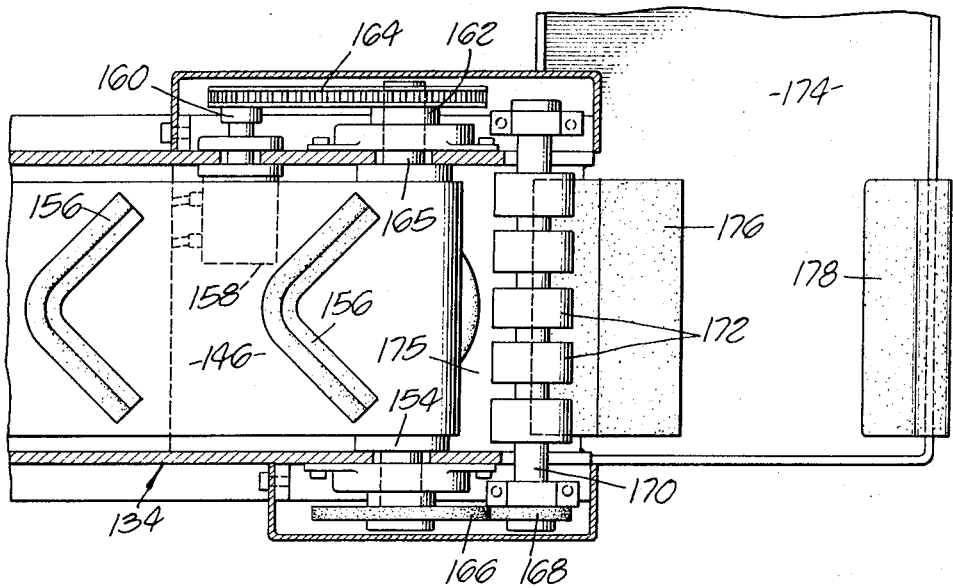
FIG. 14 is a fragmentary plan view, partly in section, as seen along the line 14—14 of FIG. 13.

The construction of each of the side conveyors 134 is best shown in FIGS. 13 and 14. The previously mentioned belt 146 passes around a drive roller 154 at the discharge end of the side conveyor and passes around an idler roller 155 at the receiving end of the side conveyor. Preferably, the belt 146 is provided with angular rubber cleats 156 to engage the fruit.

A hydraulic motor 158 drives a sprocket 160 which is connected to a second sprocket 162 by a sprocket chain 164, the second sprocket 162 being keyed to a drive shaft 165 that carries the drive roller 154. The second end of the drive shaft 165 carries a friction wheel 166 which peripherally engages a second friction wheel 168. The second friction wheel 168 drives a transverse countershaft 170 that carries a series of axially spaced rubber rollers 172.

Fruit that reaches the discharge end of each of the side conveyors 134 passes over the spaced rollers 172 to drop into a cross chute 174. Leaves, twigs, and other debris fall through the clearance space 175 between the end of the belt 146 and the rollers 172. Adjacent each of the side conveyors 134, the cross chute 174 is provided with a downwardly curved rubber flap 176 and the opposite side wall of the cross chute is provided with a water-filled bag 178 that cushions the fruit.

As shown in FIGS. 1, 3, and 4, the cross chute 174 of the uppermost platform assembly 38 has the previously mentioned discharge chute 50 that empties into the upper end of the gravity conveyor 46. As shown in FIGS. 1 and 4, the cross chute 174 of the platform assembly 42 at the intermediate level has the previously mentioned discharge chute 52 that enters the gravity conveyor 46 at a lower level.

Figure 15:
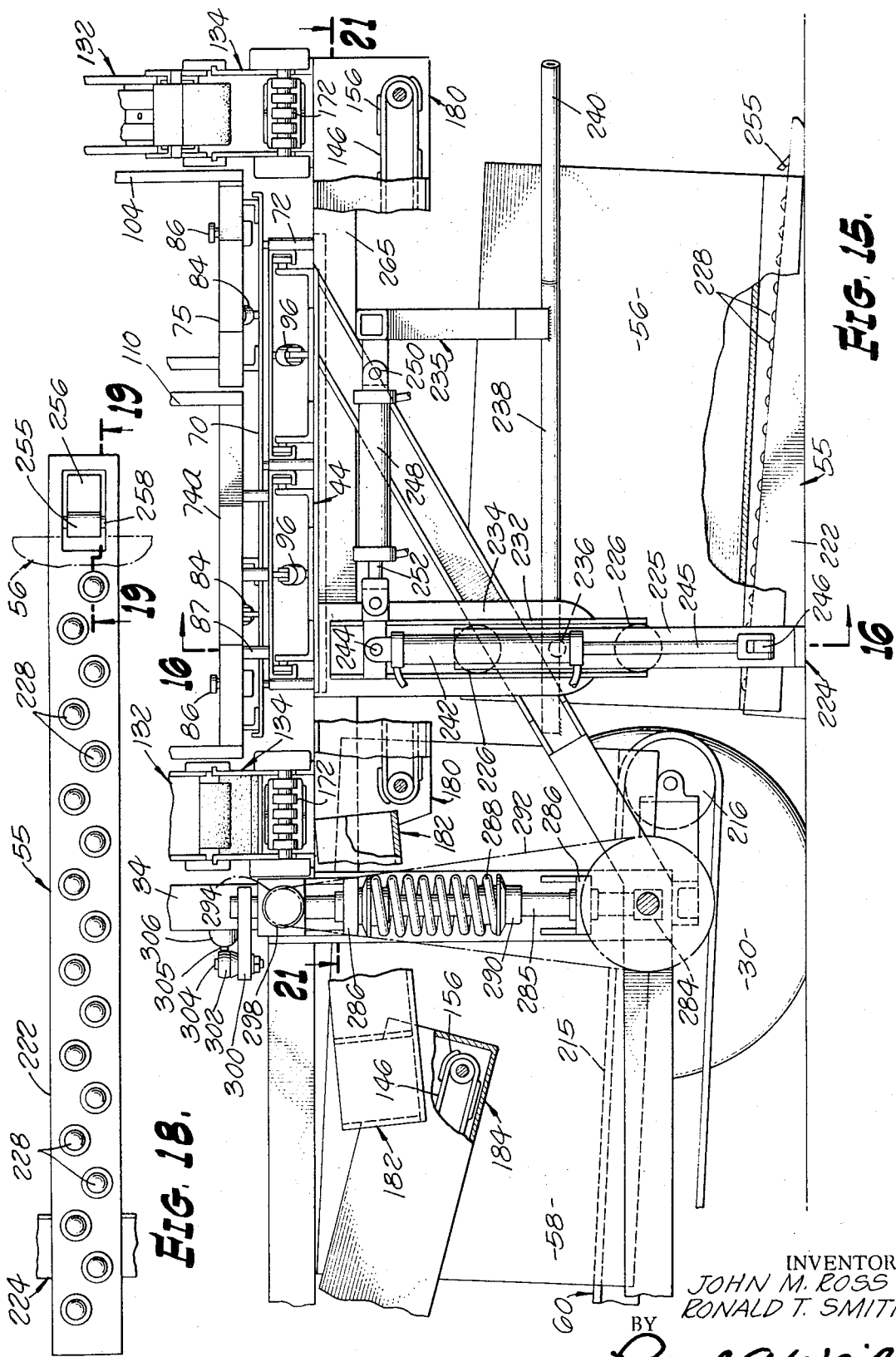
FIG. 15 is an enlarged fragmentary elevational view, partly in section, showing structure including the lift fork at the lower front end of the vehicle.

As shown in FIGS. 1 and 15, the two side conveyors 134 of the lowest level platform assembly 45 do not discharge into a cross chute, but instead discharge into a powered conveyor 180. The powered conveyor 180 is connected by a short gravity chute 182 with a second upwardly inclined powered conveyor 184 which, as indicated in FIGS. 1 and 4, is provided at its discharge end with the previously mentioned discharge chute 54 which directs the fruit into a lower level of the gravity conveyor 46. Each of the two conveyors 180 and 184 is of the same general construction as the side conveyors 134, each having a belt 146 provided with rubber cleats 156 and driven by a corresponding motor (not shown).

The gravity conveyor 46 which is shown in FIGS. 1 and 4 is an upright box-like structure that forms a vertical zone for gravitational movement of the fruit, the gravity conveyor having a plurality of barriers 185 that are distributed horizontally and vertically across the gravity zone to provide at spaced levels suitable openings through which the fruit may drop. The barriers which are of soft and resilient construction are positioned to repeatedly interrupt the free fall of the fruit to limit the distance of each free fall to a fraction of the total vertical distance through the gravity conveyor, the free falls being short enough to keep the fruit from accelerating to such high velocity as to be damaged by impact against the interrupting barriers.

Referring to FIG. 4, the gravity conveyor 46 is made in four sections comprising a top section 186, two intermediate sections 188 and 190, and a bottom section 192. The top section 186 is fixedly supported by an upright frame 194 that rests on transverse members 198 of the framework of the vehicle. The three upper sections 186, 188, and 190 are enclosed by a housing 214 that is open at its top and bottom and that has suitable side openings to receive fruit from the discharge chutes 52 and 54, and the bottom section 192 is movable upwardly from its normal position shown in FIG. 4 into the interior of the housing.

The intermediate section 188 slidingly engages upright guides in the form of four slots 200 in the housing 214 and is movable upwardly from its normal position shown in FIG. 4 towards the upper section 186. At the lower normal position of the intermediate section 188, it is supported by laterally extending guide lugs 202 thereof each of which extends into a slot 200 and rests on a horizontal frame member 204 that extends across the slot.

The second intermediate section 190 of the gravity conveyor is shown at its normal position in FIG. 4 where laterally extending tongues 205 of the section that extend into the guide slots 200 rest on transverse frame members 206 that extend across the slot. The intermediate section 190 is movable upwardly from its normal lower position along the guide angles 200 towards the intermediate section 188.

The bottom section 192 of the gravity conveyor 46 is supported by brackets 208 on the lower ends of corresponding piston rods 210 which extend downwardly from corresponding hydraulic cylinders 212, the hydraulic cylinders being mounted on opposite sides of the fixed frame 194.

FIG. 4 shows the gravity conveyor 46 retractably extended downwardly into the previously mentioned field bin 48 at the bin-filling station of the apparatus. As the field bin gradually fills with fruit, the lower end of the gravity conveyor 46 is progressively retracted upwardly and is eventually elevated sufficiently to clear the top of the field bin as the field bin fills with fruit. The upward retraction of the gravity conveyor 46 is accomplished by the hydraulic cylinders 212, the bottom section 192 being drawn upwardly by the brackets 208 moving along slots in the side walls of the housing 214. First the bottom section 192 moves against the underside of the intermediate section 190 and lifts the intermediate section 190 against the next intermediate section 188 and then the three lower sections move in unison towards the top fixed section 186. The maximum distance of free fall of the fruit inside the gravity conveyor 46 is the distance between the sections when the sections are at their maximum spacing shown in FIG. 4, but this free fall distance is short enough to keep the fruit from being damaged by impact against the soft barriers 185.

THE BIN HANDLING SYSTEM

As shown in FIG. 4, the rear bin conveyor 62 at the filling station comprises a pair of parallel closed loops of sprocket chain 215 engaged by sprockets 216 that are actuated by a fluid motor 218. The forward bin conveyor 60 is of similar construction having two conveyor chains 215 on similar sprockets 216 driven by a second fluid motor 220.

As heretofore stated, the function of the lift fork 55 is to pick up empty field bins from the ground in the path of travel of the vehicle and to deliver the empty bins to the forward conveyor 60 for conveyance to the filling station on the rear conveyor 62.

Figure 16:
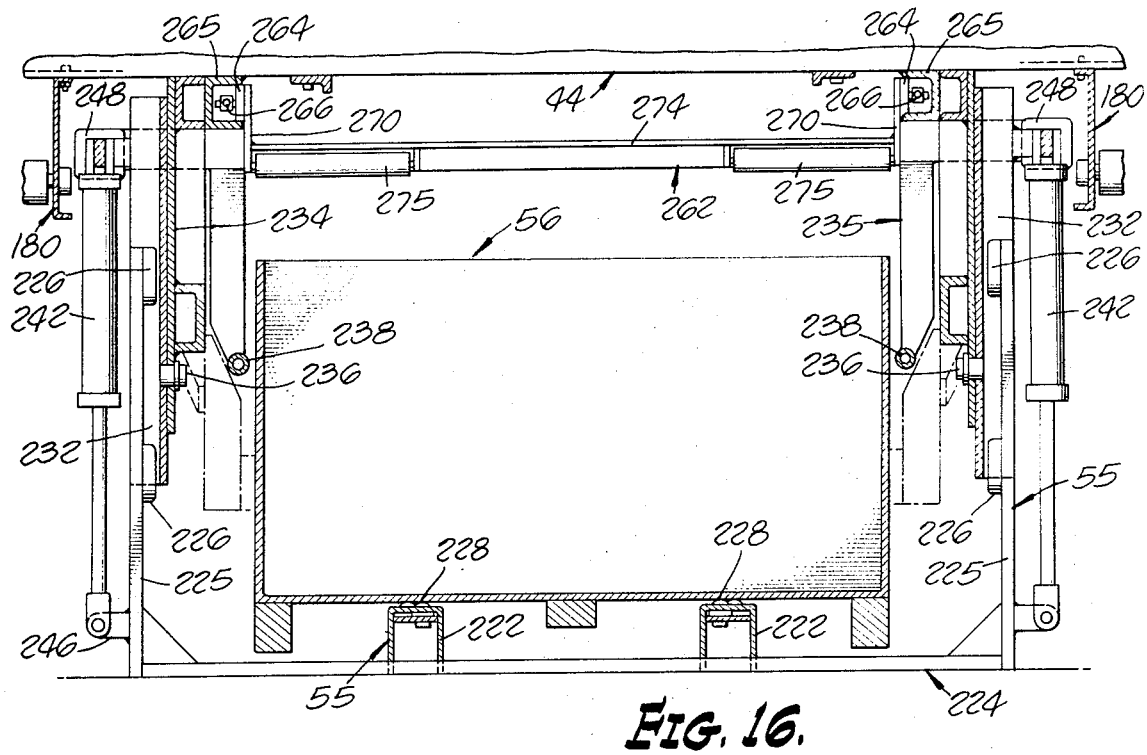
FIG. 16 is a sectional view taken along the line 16—16 of FIG. 15 showing an empty field bin on the lift fork.
Figure 17:
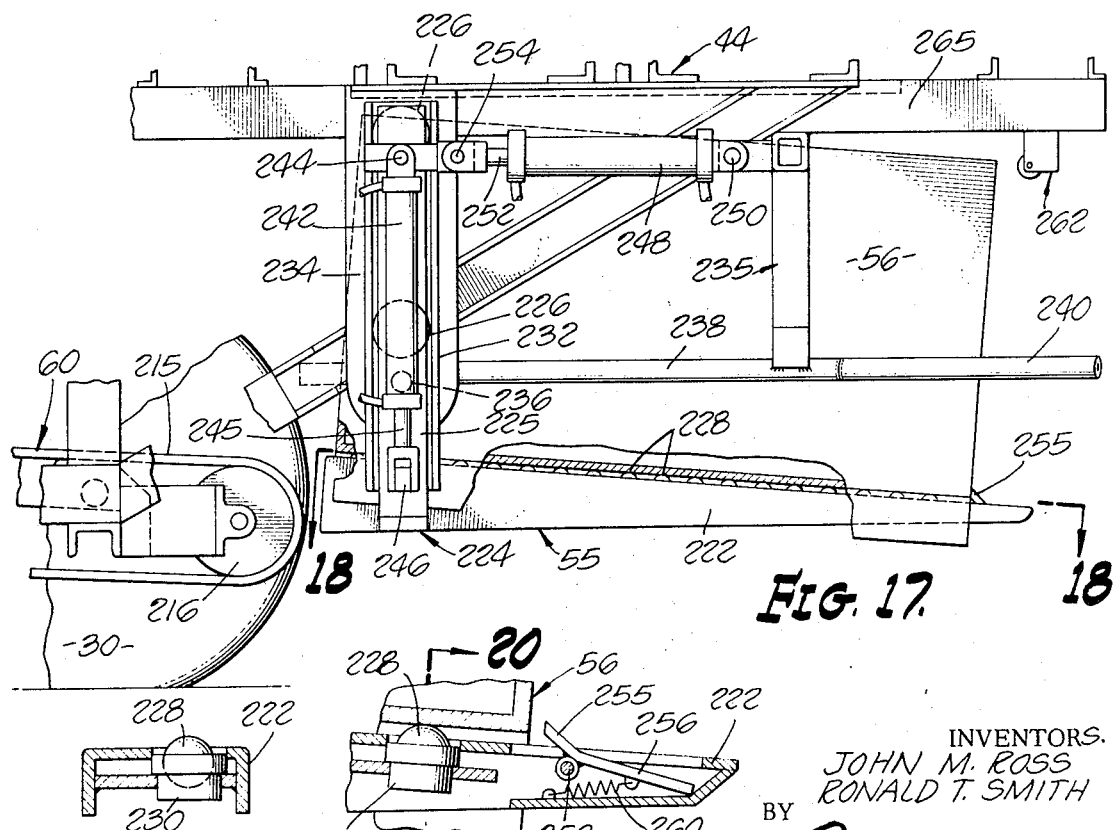
FIG. 17 is a fragmentary elevational view similar to FIG. 15 showing the lift fork in elevated position.
Figures 19, 20:
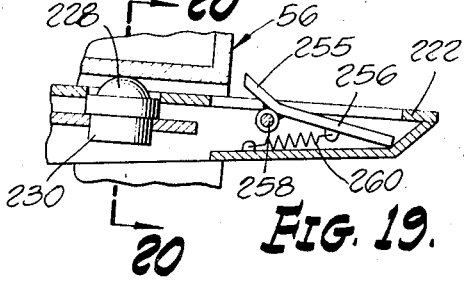
FIG. 19 is a fragmentary sectional view taken along the line 19—19 of FIG. 18.
FIG. 20 is a fragmentary sectional view taken along the line 20—20 of FIG. 19.

Referring to FIGS. 15, 16, and 17, the lift fork 55 comprises two forwardly extending fork members 222 that are fixedly mounted on a U-shaped frame 224 that has two opposite upwardly extending side arms 225 each of which carries two vertically spaced guide rollers 226. Each of the fork members 222 is a longitudinally tapered inverted channel member having a series of upwardly protruding balls 228 that are rotatably mounted in bearing cups 230 (FIG. 19).

The two guide rollers 226 of each of the upwardly extending side arms 225 of the lift fork frame 224 track in two corresponding tiltable guideways 232 in the form of channels. The two guideways 232 are pivotally mounted on corresponding upright plates 234 of a fixed frame 235 and for this purpose each of the two guideways has a pivot stud 236 (FIG. 16) which extends through a corresponding bore in the corresponding fixed plate 234. The fixed frame 235 includes a pair of forwardly extending guard rails 238 on opposite sides of the lift fork with the outer ends 240 of the guard rails bent outwardly as shown in FIG. 21 to guide boxes onto the lift fork.

For the purpose of raising and lowering the lift fork 55, two hydraulic cylinders 242 are mounted by their upper ends on pivots 244 at the upper ends of the corresponding guideways 232 and each hydraulic cylinder has a downwardly extending piston rod 245 which is pivotally connected to a corresponding bracket 246 on the corresponding side of the lift fork frame. With the lift fork in its lower position shown in FIGS. 1, 15, and 16, the two hydraulic cylinders 242 may be energized to elevate the lift fork to an upper position shown in FIG. 17.

The elevated lift fork may be tiled from the position shown in FIG. 17 to the position shown in FIG. 24 by energizing a pair of hydraulic cylinders 248 positioned to one side of the lift fork. As shown in FIGS. 21 and 24, the front ends of the hydraulic cylinders 248 are pivotally connected to the fixed frame 235 by pivots 250 and piston rods 252 extending from the rear ends of the cylinders are connected by pivots 254 to the upper end of the guideways 232 of the lift fork frame 224. FIG. 24 shows a piston rod extended to tilt the lift fork rearwardly.

The leading end of each of the fork members 222 of the lift fork is provided with a rearwardly directed stop finger 255 which is one arm of a lever 256 that is mounted on a pivot 258. The second forward arm of the lever 256 is connected to a coil spring 260 which urges the lever to a normal position shown in FIG. 19. When the two fork members 222 are advanced under a field bin 56, the stop finger 255 is swung downwardly out of the way by the field bin and when the fork member advances sufficiently to place the stop finger beyond the far end of the bin, the stop finger is returned by the spring 260 to its normal effective position shown in FIG. 19. At this normal position the stop finger blocks forward longitudinal movement of the bin off the fork member.

Associated with the lift fork 55 is an overhead bin-shifting means, that is generally designated 262 in FIGS. 16, 21, and 22. On each of two sides of the vehicle a shoe 264 in the form of a heavy plate is slidable along a horizontal fixed channel member 265 of the vehicle frame. The two shoes are reciprocated by the piston rods 266 of two corresponding hydraulic cylinders 268 that are fixedly mounted in the two channel members respectively.

Two short angle irons 270 attached to the two shoes 264 respectively by cap screws 272 extend downwardly to support the opposite ends of a transverse angle iron 274. Mounted on the transverse angle iron 274 are two spaced coaxial rollers 275 which, as shown in FIG. 22, protrude slightly rearwardly from the transverse angle iron.

When a field bin 56 is on the lift fork 55 with the lift fork at its lower position shown in FIGS. 15 and 16, the field bin is too low for engagement by the bin-shifting means 262. When the lift fork 55 is elevated, however, as shown in FIG. 17, the field bin 56 thereon is high enough for engagement of the forward end of the field bin by the rollers 275 in the manner shown in broken lines in FIG. 22. Thus, when the lift fork 55 is elevated, the two hydraulic cylinders 268 may be energized to retract the piston rods 266 and thereby draw the bin-shifting means 262 rearwardly to force a field bin on the lift fork rearwardly onto the forward bin conveyor 60. The hydraulic cylinders 248 may be energized to tilt the elevated lift fork 55 rearwardly as shown in FIG. 24 to cause the field bin to be urged rearwardly off the lift fork by gravity as well as by the bin-shifting means 262.

Referring to FIGS. 1 and 25-27, the discharge ramp means 64 comprises two spaced ramps 400 equipped with rollers 402, the two ramps cooperating to receive successive filled field bins 48 from the rear bin conveyor 62. Each of the two ramps 400 is movable from a normal elevated position shown in full lines in FIG. 26 to a ground level position shown in dotted lines. Each of the two ramps 400 is guided along an arcuate path by pairs of links 404 and 406, there being one pair of the links on each side of each ramp. The two links 404, 406 of each pair are pivoted both to the ramp and to the frame of the vehicle and the two links of each pair are slightly out of parallel to cause the ramp to change from a slightly downwardly inclined attitude at its upper position to a somewhat greater downward inclination at its ground position.

The elevation of the two ramps 400 is controlled by the piston rods 408 of two hydraulic cylinders 410 and for this purpose the piston rods are connected to a cross beam 412 to which the two ramps are fixedly attached. Since the discharge ramp means is directly under the driver's seat 276, the driver is completely aware of the movement of the filled field bins from the rear bin conveyor 62 onto the two ramps 400.

When the filled bin 413 shown in FIGS. 25 and 26 is delivered to the pair of ramps 400 by the rear bin conveyor 62, the filled bin gravitates along the rollers 402 to two stops 414 that are mounted on the two ramps respectively at their outer ends. Each stop 414 is mounted on a pivot 415 to rotate from an upper effective position shown in full lines in FIG. 26 and a lower release position shown in dotted lines.

For automatic control of the two stops 414, each is connected by a pivot 416 to a long link 418 which in turn is connected by a pivot 420 to a short link 422 that is mounted on the side of the ramp by a pivot 424. A link 425 is connected at one end to the pivot 420 and at its second end is connected by a pivot 426 to the frame of the vehicle. The last link 425 is so located and so inclined as to cause rotation of the stop 414 from its stop position to its release position in response to lowering of the corresponding ramp 400.

When the driver causes the discharge ramp means 64 to lower for discharge of a filled bin 413, the rear ends of the two ramps 400 touch the ground and the filled bin rolls rearwardly until its leading end touches the ground. As the vehicle subsequently moves forward the two ramps 400 are dragged out from under the filled bin 428 to leave the filled bin behind.

MEANS FOR PROPELLING AND STEERING THE APPARATUS

The driver of the vehicle is provided with a seat 276 adjacent a control housing 278 that has a steering wheel 280 for the front pair of gound wheels 30. Various manually operable controls are provided at the control housing 278 including a hand lever 282 that may be swung laterally in opposite directions to steer the rearward pair of gound wheels 32.

As shown in FIGS. 1, 4, and 15, each of the four ground wheels 30, 32 is mounted on the lower arm 284 of a corresponding upright column 285 that is rotatably and slidably journalled in spaced bearings 286 on the frame of the vehicle. Heavy coil springs 288 in compression between collars 290 on a shaft 285 and the upper bearings 286 yieldingly support the vehicle.

To propel the vehicle, each of the four ground wheels is connected by a corresponding sprocket chain 292 to an upper sprocket 294 on a motor shaft 295 carried by a bracket 296, the bracket being fixed to the upright column 285 in a radial position to keep the motor shaft parallel with the lower arm 284. The motor shaft 295 is actuated by a hydraulic motor 298.

Each of the upright columns 285 is controlled by a crank arm 300 on its upper end, the two crank arms of each pair of ground wheels being parallel nd being interconnected by a long link 302. As indicated in FIG. 18, the longlink 302 for controlling the front pair of ground wheels 30 is connected by a pivot 304 to a piston rod 305 of a hydraulic cylinder 306 and in like manner, as shown in FIG. 1, the link 302 that connects the crank arms 300 of the rear pair of ground wheels 32 is controlled by a hydraulic cylinder 308. The hydraulic cylinder 306 for the forward pair of ground wheels is controlled by the steering wheel 280 and the rear hydraulic cylinder for the rear pair of ground wheels is controlled by the previously mentioned hand lever 282.

THE HYDRAULIC SYSTEM FOR ACTUATING AND CONTROLLING THE MOVABLE PARTS

Referring to FIG. 1, the internal combustion engine 66 which has a radiator 310 has a drive shaft 312 journalled in spaced bearings 314, the drive shaft actuating a small hydraulic pump 342 for power steering. As shown diagrammatically in FIG. 1A, the drive shaft 312 is connected by sheaves 315 and belts 316 to a first countershaft 318 that is journalled in bearings 320. The first countershaft 318 is connected by sheaves 322 and belts 324 to a second countershaft 325 journalled in bearings 326. The opposite ends of the second countershaft 325 are connected to hydraulic pumps 328 and 329 respectively which supply power for the front and rear pairs of wheels respectively. These two pumps may have a capacity, for example, of 15 gpm.

The first countershaft 318 is also connected by sheaves 330 and belts 332 to a third countershaft 334 journalled in bearings 335. The third countershaft 334 actuates four hydraulic pumps, namely: a relatively large hydraulic pump 336 which may have a capacity of 45 gpm for extending and retracting the various platforms of the three platform assemblies; a hydraulic pump 338 which may have a capacity of 8 gpm for downwardly extending and retracting the gravity conveyor 46 and also for controlling the lift fork 55, the bin-shifting means 262, and the discharge ramp means 64; and a hydraulic pump 340 which may have a capacity of 5 gpm for actuating the various fruit conveyors and bin conveyors.

Turning now to the hydraulic system that is shown diagrammatically in FIG. 30, the high pressure line 344 from the large hydraulic pump 336 has a branch to a relief valve 345 and is connected to a manually operable valve 346 that may be used to bleed the high pressure line whenever desired. The high pressure line 344 is connected to 12 four-way valves 348 which in turn are connected to the 12 hydraulic cylinders for extending and retracting the 12 platforms 74, 74a, 75, and 75a of the four platform assemblies. For example, a four-way valve 348 is shown in FIG. 30 as connected to a hydraulic cylinder 96 for extending and retracting a platform 74. The 12 four-way valves 348 are connected to a common return line 350. Each of the 12 four-way valves 348 is operated by one of the previously mentioned foot pedals 86 which controls the extension and retraction of the corresponding platform.

Referring to FIG. 28, hydraulic pump 328 for powering the forward pair of ground wheels 30 is connected to a four-way valve 352 which in turn is connected to the fluid motors 298 of the forward pair of ground wheels. In like manner, the hydraulic pump 329 is connected to a four-way valve 354 which in turn is connected to the fluid motors 298 of the rear pair of ground wheels 32. A three-position hand lever 355 on the previously mentioned forward control housing 278 operates the four-way valves 352 and 354 for reversable actuation of the two pairs of ground wheels 30, and another hand lever 356 controls variable orifices 357 in the hydraulic lines to control the speed at which the two pairs of ground wheels are driven.

Referring to FIG. 31, hydraulic pump 338 is connected to a valve panel 358 on the forward control housing 278 wherein one manually operable four-way valve (not shown) controls the hydraulic cylinders 212 for extending and retracting the gravity conveyor 46. A second four-way valve (not shown) on the valve panel 358 controls hydraulic cylinders 248 for tilting the lift fork 55 and a third four-way valve (not shown) controls the hydraulic cylinders 242 for raising and lowering the lift fork 55. A fourth four-way valve (not shown) on the valve panel 358 controls the hydraulic cylinders 268 for extending and retracting the bin-shifting means 262. A fifth four-way valve controls the pair of hydraulic cylinders 410 for lowering and raising the discharge ramp means 64.

The high pressure line 360 from the pump 338 is connected through the valve panel 358 to a line 362 for actuating the fluid motors 218 and 220 of the two field bin conveyors 62 and 60, respectively. The high pressure line 364 from the hydraulic pump 340 is connected to relief valve 366 and is connected to the six fluid motors 158 of the six side conveyors 134 of the fruit conveyor system, and is also connected to fluid motors 267 of the two fruit conveyors 180 and 184, respectively, the connection to the eight fluid motors being through suitable flow dividers 368.

Referring to FIG. 29, the high pressure line 370 from the hydraulic pump 342 is connected in the usual manner to a relief valve 372 and is connected to a rotary four-way valve 374 for controlling the hydraulic cylinder 306 that steers the front pair of wheels and a four-way valve 375 that controls the hydraulic cylinder for steering the rear pair of ground wheels 32. As heretofore indicated, the four-way valve 374 is operatively connected to the steering wheel 280 and the four-way valve 375 is operatively connected to the previously mentioned three-position lever 282 for steering the rear pair of ground wheels.

From the foregoing description it is apparent that the driver sitting in the driver's seat 276 not only controls propulsion and steering of the apparatus, but also controls the supply of successive field bins to the bin-filling station below the gravity conveyor 46 and the discharge of the filled field bins to the ground rearward of the apparatus. It is also apparent that a fruit picker standing on any one of the twelve platforms may extend or retract the platform at will by simply operating the corresponding foot pedal 86.

Our description in specific detail of the selected embodiment of the invention will suggest various changes, substitutions and other departures from our disclosure within the spirit and scope of the invention.

We claim:

1. In a mobile apparatus to facilitate harvesting fruit from trees, the combination of:
    a first platform at an elevated level to support a workman for picking fruit, said platform being retractably extensible in its plane in one direction from the apparatus laterally thereof;
    a second platform at about the same level retractably extensible from the vehicle in the opposite lateral direction;
    a first hopper on the outer end of the first platform to receive fruit;
    a second hopper on the outer end of the second platform to receive fruit;
    a fruit conveyor below the level of the two hoppers aligned with the direction of extension and retraction of the two platforms;
    chute means connected to the two hoppers respectively to deliver fruit therefrom to the fruit conveyor, said chute means being movable relative to the fruit conveyor to accommodate extension and retraction of the corresponding platforms;
    and means cooperative with said conveyor to deposit the picked fruit in successive bins at a filling station on the apparatus,
    said chute means including:
        a first chute connected to the first hopper and inclined downwardly from the hopper to said fruit conveyor to convey picked fruit thereto, the lower end of the chute being movable along the conveyor to accommodate shifting of the first hopper with extension and retraction of the fruit platform; and
        a second chute connected to the second hopper to convey picked fruit to the first chute and inclined downwardly to the first chute in the direction opposite from the downward inclination of the first chute,
        the lower end of the second chute being movable along the first chute to accommodate shifting of the second hopper with extension and retraction of the second platform.

2. A combination as set forth in claim 1 which includes yielding means to decelerate fruit moving from the hoppers to said conveyor.

3. A combination as set forth in claim 2 in which said yielding means includes a flexible bag in the path of the fruit, said bag containing a liquid.

4. In a mobile apparatus to facilitate harvesting fruit from trees, the combination of:
    a plurality of decks at different levels;
    a first platform on each deck to support a workman for picking fruit, said platform being retractably extensible in its plane in one direction from the apparatus laterally thereof;
    a second platform on each deck at about the same level as the first platform, said second platform being retractably extensible from the vehicle in the opposite lateral direction;
    a first hopper on each deck on the outer end of the first platform thereof to receive fruit;
    a second hopper on each deck on the outer end of the second platform thereof to receive fruit;
    a fruit conveyor on each deck below the level of the two hoppers thereof aligned with the direction of extension and retraction of the two platforms thereof;
    first and second chutes on each deck connected to the respective hoppers thereof to deliver fruit from the two hoppers to the fruit conveyor of the deck, said chutes being movable relative to the fruit conveyor to accommodate extension and retraction of the corresponding platforms; and
    means including gravity conveyor means to receive the fruit from the different conveyors of the different decks and to discharge the fruit into successive bins at a filling station on the apparatus.

5. A combination as set forth in claim 4 in which said gravity conveyor means has a plurality of transverse resiliently yieldable barriers to absorb energy from the gravitating fruit.

6. A combination as set forth in claim 5 in which said gravity conveyor means has a support structure defining a zone for gravitational movement of the fruit downwardly therethrough;
    in which said barriers are distributed horizontally and vertically of the zone to provide at spaced levels a plurality of openings through which the fruit may gravitate,
    said barriers being yieldable to avoid damaging the fruit and being positioned to repeatedly interrupt free fall of the fruit to limit the distance of free fall of the fruit through the zone.

7. A combination as set forth in claim 6 in which said filling station is directly under the gravity conveyor means to receive the fruit therefrom;
    which includes means to supply successive empty bins to the filling station;

and which includes means to move the successive filled bins from the filling station to the ground adjacent the apparatus.

8. In an apparatus of the character described to facilitate picking fruit from trees, the combination of:
a vehicle having ground wheels;
at least one elevated base structure on the vehicle;
a platform assembly on the base structure;
a first pair of platforms included in said platform assembly and movably mounted on the forward portion of the elevated base structure and retractably extensible in opposite directions laterally of the vehicle along overlapping paths;
a second pair of platforms included in said platform assembly movably mounted on the rearward portion of the elevated base structure and retractably extensible in opposite directions laterally of the vehicle along overlapping paths;
a first laterally extending conveyor included in said platform assembly on the forward side of the elevated base structure;
a second laterally extending conveyor included in said platform assembly on the rearward side of the elevated base structure;
a first pair of hoppers included in said platform assembly and mounted on the platforms respectively of said first pair of platforms;
a second pair of hoppers included in said platform assembly and mounted on the platforms respectively of said second pair of platforms;
chutes from the first pair of hoppers to deliver fruit to the first conveyor at all positions of the extension and retraction of the first platforms;
chutes from the second pair of hoppers to deliver fruit to the second conveyor at all positions of extension and retraction of the second pair of platforms; and
means to convey fruit from said conveyors to bins at a filling station on the vehicle.

9. A combination as set forth in claim 8 which includes a plurality of base structures at different levels, each equipped with a platform assembly; which includes gravity conveyor means positioned above the filling station; and which includes means to convey picked fruit from the various laterally extending conveyors to the gravity conveyor.

10. A combination as set forth in claim 9 in which said gravity conveyor means has resiliently yieldable barriers distributed horizontally and vertically to repeatedly interrupt free fall of the fruit to limit the distance of free fall of the fruit to distances small enough to keep to fruit from accelerating to such high velocity as to cause significant damage to the fruit by impact against the interrupting barriers.

11. In a mobile apparatus of the character described to facilitate picking fruit from trees, the combination of:
a plurality of platforms at different levels on the apparatus to support fruit-picking personnel;
hoppers to receive picked fruit at the different levels;
conveyor means including moving conveyors to convey picked fruit from the hoppers to successive bins at a filling station on the vehicle;
support structure near the front end of the vehicle forming downwardly extending guideway means, said support structure being pivotally mounted on the vehicle to swing about a transverse axis;
fork means to pick up empty receptacles in the path of the vehicle, said fork means movably engaging said guideway means for up and down movement along the guideway means;
remotely controlled power means on said support structure in engagement with the fork means to raise and lower the fork means along said guideway means; and
remotely controlled power means on the vehicle in engagement with said support structure to rock the support structure about its transverse axis thereby to tilt the fork means.

12. A combination as set forth in claim 11 in which said fork means has a plurality of members freely rotatable on fixed axes to minimize resistance to movement of bins onto and off of the fork means.

13. A combination as set forth in claim 12 which includes stop means to engage the successive bins to keep the successive bins from gravitating off the fork means when the fork means is tilted towards the ground.

14. A combination as set forth in claim 13 in which said stop means is pivoted to retract from its effective position and in which the stop means is biased to its effective position.

15. A combination as set forth in claim 14 in which the stop means is shaped and dimensioned to be cammed to its retracted position by a bin moving onto the fork means.

16. A combination as set forth in claim 15 which includes a power-actuated conveyor adjacent the rear end of the fork means to receive bins therefrom and to move the bins towards the filling station;
and which includes power-actuated bin-shifting means to engage successive bins on the fork means to shift the successive bins onto said power-actuated conveyor,
said engagement means being at an elevation to clear a bin on the fork means when the fork means is lowered and to engage a bin on the fork means when the fork means is elevated.

17. In an apparatus for harvesting fruit from trees, having in combination:
a vehicle having ground wheels and having a plurality of base structures at different levels;
at least one platform on each base structure to support a workman for picking fruit, the platform being movable between a retracted position and a position extending laterally of the vehicle;
power means operable to extend and retract the platforms;
hoppers at the respective platforms to receive fruit picked from trees;
means to support successive field bins at a filling station on the vehicle;
means to convey picked fruit from the hoppers to the filling station, said conveying means including chute means connected to the respective hoppers, said chute means being extensible and retractable to follow extension and retraction of the corresponding platforms; and
means to convey the successive filled bins away from the filling station,
said means to convey the successive filled bins away from the filling station including:

ramp means on the trailing end of the vehicle;
rotary antifriction elements on the ramp means to facilitate movement of the filled bins along the ramp means;
power-actuated conveyor means to move successive filled bins from the filling station to the ramp means;
power-actuated means to raise and lower the ramp means between an elevated position to receive the filled bins from the filling station and a lower position to deposit the filled bins on the ground; and
stop means to keep the filled bins on the ramp means,
said stop means being releasable to permit the filled bins to leave the ramp means when the ramp means is lowered to its lower position.

18. A combination as set forth in claim 17 which includes means to release the stop means in response to movement of the ramp means from its elevated position to its lower position.

* * * * *